(12) United States Patent
Pinot

(10) Patent No.: US 12,484,579 B2
(45) Date of Patent: Dec. 2, 2025

(54) AGROCHEMICAL COMPOSITION AND METHODS OF PREPARING AND USING THE SAME

(71) Applicant: SPECIALTY OPERATIONS FRANCE, Lyons (FR)

(72) Inventor: Florent Pinot, Colombes (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 768 days.

(21) Appl. No.: 17/261,922

(22) PCT Filed: Jul. 22, 2019

(86) PCT No.: PCT/EP2019/069632
§ 371 (c)(1),
(2) Date: Jan. 21, 2021

(87) PCT Pub. No.: WO2020/025370
PCT Pub. Date: Feb. 6, 2020

(65) Prior Publication Data
US 2022/0104491 A1 Apr. 7, 2022

(30) Foreign Application Priority Data

Jul. 31, 2018 (EP) .................... 18186468

(51) Int. Cl.
*A01N 43/58* (2006.01)
*A01N 25/02* (2006.01)

(52) U.S. Cl.
CPC ............. *A01N 43/58* (2013.01); *A01N 25/02* (2013.01)

(58) Field of Classification Search
CPC ......... A01N 43/58; A01N 25/02; A01N 47/06
See application file for complete search history.

(56) References Cited

U.S. PATENT DOCUMENTS

| | | | |
|---|---|---|---|
| 9,090,538 B2 * | 7/2015 | Vidal et al. | ............... C08K 5/20 |
| 2011/0166025 A1 * | 7/2011 | Jentzer | ................. C11D 7/5013 |
| | | | 252/364 |
| 2013/0274107 A1 | 10/2013 | Ikeda | |
| 2014/0256554 A1 | 9/2014 | Vidal et al. | |
| 2019/0021326 A1 * | 1/2019 | Stratmann | ............... A01N 43/58 |

FOREIGN PATENT DOCUMENTS

| | | | | |
|---|---|---|---|---|
| DE | 19834627 A1 | 12/1998 | | |
| EP | 1023833 A2 | 8/2000 | | |
| GB | 2550245 A | 11/2017 | | |
| WO | WO-2013153030 A1 * | 10/2013 | ............. A01N 25/02 |
| WO | 2015007573 A1 | 1/2015 | | |

OTHER PUBLICATIONS

Abstract for DE19834627 A1.
KP55510802A_Landwitschaftskammer: "Herbizide in Mais—Aufwandmengen und Wirkungsspeketren", Jan. 30, 2017, pp. 1-6.
XP55510899A_Belchim: "Onyx Fiche de donnees de securite", Jan. 28, 2016, pp. 1-9.

* cited by examiner

*Primary Examiner* — Robert A Wax
*Assistant Examiner* — John Seungjai Kwon
(74) *Attorney, Agent, or Firm* — Osha Bergman Watanabe & Burton LLP

(57) ABSTRACT

The present invention is relative to an agrochemical composition comprising as herbicidal substance a combination of a phenylpyridazine derivative and a triketone, a defined solvent, and a surfactant system comprising a non ionic and an anionic surfactant. The invention also concerns a process for the preparation of said agrochemical composition, an agrochemical emulsion or suspoemulsion obtainable by diluting said agrochemical composition and a method of controlling undesired vegetation using said agrochemical composition.

17 Claims, No Drawings

AGROCHEMICAL COMPOSITION AND METHODS OF PREPARING AND USING THE SAME

This application is a U.S. national phase entry under 35 U.S.C. § 371 of International Application No. PCT/EP2019/069632, filed on Jul. 22, 2019, which claims priority to European Application No. 18186468.7, filed on Jul. 31, 2018. The entire contents of these applications are explicitly incorporated herein by this reference.

TECHNICAL FIELD

The present invention is relative to an agrochemical composition comprising as herbicidal substance a combination of a phenylpyridazine derivative and a triketone, a particular solvent, and a surfactant system comprising a non ionic and an anionic surfactant. The invention also concerns a process for the preparation of said agrochemical composition, an agrochemical emulsion or suspoemulsion obtainable by diluting said agrochemical composition and a method of controlling undesired vegetation using said agrochemical composition.

BACKGROUND

Herbicides are widely used in crop protection. Most of them are used as sole actives in agrochemical compositions, but it has been discovered that some of them may increase their activity when used in association. For practical reasons, it is desirable for the end user to have a single composition to apply to its crop.

However, combining different actives in the same agrochemical composition can be challenging, in particular when the herbicides to be combined have different physical and chemical characteristics. The choice of the adjuvants, solvents and surfactants that allow combining actives from different families into a single stable agrochemical composition can be the object of a long and extensive research.

It was therefore the objective of the present invention, to propose a stable composition combining the two following families of herbicidal actives: phenylpyridazine derivatives and triketones.

It has been discovered that those two families of actives are increasing their activity against unwanted vegetation when used together, but also that it was difficult to formulate them in a single stable formulation without observing physical stability issues and/or chemical degradation of the actives.

BRIEF DESCRIPTION OF THE INVENTION

The objective of the present invention has been met by providing an agrochemical composition comprising:
- as herbicidal substance: a combination of a phenylpyridazine derivative and a triketone;
- a solvent selected in the group consisting of dioxolanes, N,Ndialkylamides, diesters, esteramides and mixtures thereof; and
- a surfactant system comprising a non ionic and an anionic surfactant.

The present invention also provides a process for the preparation of said agrochemical composition, wherein the phenylpyridazine derivative, the triketone, the surfactant system described above and the solvent are mixed together.

It is a third aspect of the present invention to propose an agrochemical emulsion or suspoemulsion obtainable by diluting the agrochemical composition defined above, preferably with a dilution ratio which ranges from 0.1:99.9 to 5.0:95.0, preferably from 0.2:99.8 to 3.0:97.0 and more preferably from 0.3:99.7 to 1.0:99.0.

Last, it is also an object of the invention to propose a method of controlling undesired vegetation, comprising applying an effective amount of said agrochemical composition or of said agrochemical emulsion or suspoemulsion to plants (crop or undesired ones), seeds or to the soil.

DETAILED DESCRIPTION OF THE INVENTION

Definitions

The term "agrochemical composition" means a chemical formulation to be used in agriculture. In most cases, agrochemical refers to pesticides including insecticides, herbicides, fungicides and nematicides. It may also include synthetic fertilizers, hormones and other chemical growth agents, and concentrated stores of raw animal manure.

"Herbicidal substance" or "herbicides", also commonly known as weedkillers, are chemical substances used to control unwanted plants. Selective herbicides control specific weed species, while leaving the desired crop relatively unharmed, while non-selective herbicides (sometimes called total weedkillers in commercial products) can be used to clear waste ground, industrial and construction sites, railways and railway embankments as they kill all plant material with which they come into contact.

As used herein, the terminology "a combination of a phenylpyridazine derivative and a triketone" means that the two families of herbicides are present. It has also to be understood that one or more herbicides of each family can be present.

"A solvent" is understood in a broad sense, in particular covering the functions of co-solvent, crystallization inhibitor and stripping agent. The term solvent may especially denote a product that is liquid at the usage temperature, preferably having a melting point less than or equal to 20 degrees centigrade, preferably 5 degrees centigrade, preferably 0 degrees centigrade, which may contribute to rendering a solid substance liquid, or to preventing or retarding the solidification or the crystallization of material in a liquid medium.

As used herein, the terminology "a surfactant system" in the sense of the present invention is a compound that lowers the surface tension (or interfacial tension) between two liquids, between a gas and a liquid, or between a liquid and a solid.

"Emulsion" has to be understood as a mixture of two or more liquids that are normally immiscible (unmixable or unblendable). Emulsions are part of a more general class of two-phase systems of matter called colloids. Although the terms colloid and emulsion are sometimes used interchangeably, emulsion should be used when both phases, dispersed and continuous, are liquids.

"Suspoemulsion" in the meaning of the present invention, is an emulsion that also contains particles (for instance of herbicidal active) in suspension.

As used herein, the terminology "controlling" in the sense of the present invention means reducing, preventing, limiting or eliminating the undesired vegetation.

"Undesired vegetation" or "unwanted vegetation" refers to all plants, such as, broad-leaved weeds, weed grasses or Cyperaceae, which grow at sites where they are unwanted.

As used herein, the terminology "effective amount" or "herbicidally effective amount" in reference to the relative amount of herbicide in an herbicidal composition means the relative amount that is effective to control growth of a target plant when the herbicidal composition is spray applied to the target plant and/or to the environment of the plant at a given application rate.

The term "a" is a generic plural, which means that it covers at least one, but also possibly several compounds that it designates. For sake of conciseness this term has been used in the specification and claims but it can be replaced by "at least one" or "one or more" all along the text of this invention, without any change in the meaning, except if explicit mention is made in the description.

Herbicidal Substance

As mentioned above, the agrochemical composition according to the invention comprises, as herbicidal substance, a combination of a phenylpyridazine derivative and a triketone.

Phenylpyridazine Derivatives

Phenylpyridazine derivatives are selective herbicides for controlling unwanted vegetation belonging to the C3 classification according to the Herbicide Resistance Action Committee (HRAC). They belong to the class of photo system II inhibitors, which means that their mechanism of action is based on the inhibition of the photosynthesis process at the level of the photo system II in plants. In particular, this kind of herbicide inhibits the binding of quinone to the D1 protein of photo system II whereby electrons accumulate in chlorophyll molecules and an excess of oxidation occurs, causing the plant to die. Phenylpyridazine derivatives include pyridate, pyridafol and pyrazon.

According to the invention, the phenylpyridazine derivative is advantageously selected in the group consisting of pyridate, pyridafol, pyrazon and mixtures thereof, preferably pyridate.

Pyridate and pyridafol have the phenyl substituent attached to the C atom in the pyridazine heterocycle whereas pyrazon has the phenyl substituent attached to the N atom in the pyridazine heterocycle.

The developed structures are as followed:

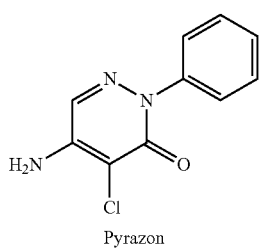

Pyrazon

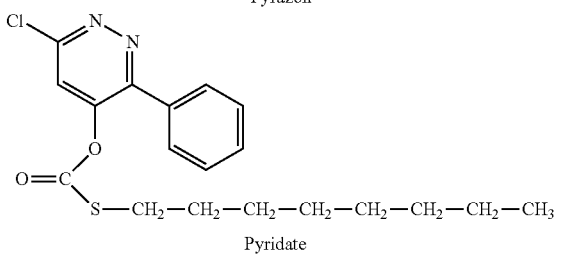

Pyridate

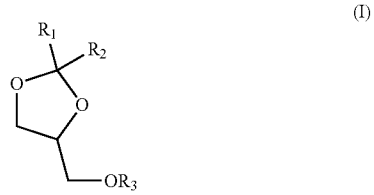

Pyridafol

Pyridate (IUPAC name (6-chloro-3-phenylpyridazin-4-yl) octylsulfanylformate) can be obtained from chlorination of 3-phenyl-pyridazone-6 and subsequent saponification to produce phenyl-4-hydroxy-6-chloropyridazine which is further reacted to produce pyridate.

It is a commercial herbicide.

Triketones

Triketones are selective herbicides for controlling unwanted vegetation belonging to the F2 classification according to the Herbicide Resistance Action Committee (HRAC). Their mechanism of action is based on the inhibition of the pigment synthesis (also called bleaching herbicides). Triketone herbicides include mesotrione, tembotrione, sulcotrione, and tefuryltrione.

In the agrochemical composition according to invention the triketone is advantageously selected from the group consisting of mesotrione, tembotrione, sulcotrione, tefuryltrione and mixtures thereof, preferably mesotrione.

Mesotrione (IUPAC name 2-(4-methylsulfonyl-2-nitrobenzoyl)-cyclohexane-1,3-dione), tembotrione (IUPAC name 2-[2-chloro-4-methylsulfonyl-3-(2,2,2-trifluoroethoxymethyl)benzoyl]cyclohexane-1,3-trione), sulcotrione (IUPAC name 2-[2-Chloro-4-(methylsulfonyl)-benzoyl]-1, 3-cyclohexanedione) and tefuryltrione (IUPAC name 2-[2-chloro-4-methylsulfonyl-3-(oxolan-2-ylmethoxymethyl) benzoyl]cyclo-hexane-1,3-dione) are all commercial herbicides.

Ratio Between the Herbicidal Actives

The weight ratio of phenylpyridazine derivative:triketone in the agrochemical composition according to the invention can vary from 0.1:1 to 1000:1, preferably from 0.1:1 to 50:1 and more preferably from 0.1:1 to 35:1. When triketone is mesotrione, the range can be more preferably from 1:1 to 10:1.

Solvent

As mentioned above, the agrochemical composition according to the invention also comprises a solvent selected in the group consisting of dioxolanes, N,N-dialkylamides, diesters, esteramides and mixtures thereof.

Dioxolane

In a first and preferred embodiment, the solvent is a dioxolane or a mixture of dioxolanes.

According to this first embodiment, the dioxolane is advantageously of formula I:

$$\text{(I)}$$

(structure with $R_1$, $R_2$, $OR_3$)

wherein

R$_1$ and R$_2$, independently from one another, are selected in the group consisting of: a linear or branched C$_1$-C$_{12}$ alkyl, a C$_4$-C$_{12}$ cycloalkyl or an aryl.

R$_3$ is H, a linear or branched alkyl, a cycloalkyl or a —C(=O)R$_4$ group, with R$_4$ being a linear or branched C1-C4 alkyl or C5-C6 cycloalkyl.

In a preferred embodiment, R$_1$ and R$_2$, independently from one another, are selected in the group consisting of: methyl, ethyl, isopropyl, n-propyl, isobutyl, n-butyl, tert-butyl, n-pentyl, cyclopentyl, cyclohexyl or phenyl.

Advantageously, in formula I above R$_3$ is H or a —C(=O)R$_4$ group, with R$_4$ being methyl, ethyl, isopropyl, n-propyl, isobutyl, n-butyl or tert-butyl. More preferably, R$_3$ is H.

One preferred embodiment is when R$_1$ and R$_2$ are methyl and R$_3$ is H. In this case, the compound is commercially available, for example under the name Rhodiasolv® Li-Tec 2V. This compound can be synthesized by reaction between glycerol and acetone, under well-known classical conditions.

In another embodiment, R$_1$ is methyl, R$_2$ is isobutyl and R$_3$ is H. In this case, the compound is commercially available. This compound can be synthesized by reaction between glycerol and methyl-isobutyl ketone, under well-known classical conditions.

In a third embodiment, R$_1$ is methyl, R$_2$ is phenyl and R$_3$ is H. In this case, the compound is commercially available. This compound can be synthesized by reaction between glycerol and acetophenone, under well-known classical conditions.

Another possibility is to have R$_1$ and R$_2$ are methyl and R$_3$ is a —C(=O)R$_4$ group, with R$_4$ being methyl. In this case, the compound is commercially available. This compound can be synthesized by transesterification of Solketal with an alkyl acetate under well-known classical conditions.

Glycerol can be obtained as a coproduct from biodiesel production during the transesterification of triglycerides.

Esteramide

In a second embodiment, the solvent is an esteramide.

According to this second embodiment, the esteramide can be of formula II:

R$_5$OOC-A-CONR$_6$R$_7$ (II)

wherein:
R$_5$ is a radical selected from saturated or unsaturated, linear or branched, optionally cyclic, optionally aromatic hydrocarbon-based radicals having an average number of carbon atoms ranging from 1 to 36;

R$_6$ and R$_7$, which may be identical or different, are each radicals selected from saturated or unsaturated, linear or branched, optionally cyclic, optionally aromatic, optionally substituted hydrocarbon-based radicals having an average number of carbon atoms ranging from 1 to 36, with the proviso that R$_6$ and R$_7$ may optionally together form a ring member that is optionally substituted and/or that optionally contains a heteroatom; and A is a linear or branched divalent alkyl radical having an average number of carbon atoms ranging from 2 to 12.

The R$_5$, R$_6$ and R$_7$ groups, which are identical or different, may especially be groups chosen from C$_1$-C$_{12}$ alkyl, aryl, alkaryl or arylalkyl groups or the phenyl group. The R$_6$ and R$_7$ groups may optionally be substituted, in particular by hydroxyl groups.

The R$_5$ group may especially be chosen from methyl, ethyl, propyl, isopropyl, n-butyl, isobutyl, n-pentyl, isopentyl, isoamyl, n-hexyl, cyclohexyl, 2-ethylbutyl, n-octyl, isooctyl, 2-ethylhexyl, tridecyl groups.

The R$_6$ and R$_7$ groups, which are identical or different, may especially be chosen from methyl, ethyl, propyl (n-propyl), isopropyl, n-butyl, isobutyl, n-pentyl, amyl, isoamyl, hexyl, cyclohexyl or hydroxyethyl groups. The R$_6$ and R$_7$ groups may also be such that they form, together with the nitrogen atom, a morpholine, piperazine or piperidine group. According to particular embodiments, R$_6$=R$_7$=methyl, or R$_6$=R$_7$=ethyl, or R$_6$=R$_7$=hydroxyethyl.

According to one particular embodiment, if A comprises a linear group of formula —CH$_2$—CH$_2$— and/or of formula —CH$_2$—CH$_2$—CH$_2$—CH$_2$— and/or of formula —(CH$_2$)$_8$— then it is a mixture of A groups. According to one particular embodiment, if A is linear, then it is a mixture of A groups, for example a mixture of two or three —CH$_2$—CH$_2$— (ethylene); —CH$_2$—CH$_2$—CH$_2$— (n-propylene); and —CH$_2$—CH$_2$—CH$_2$—CH$_2$— (n-butylene) groups.

According to a first particular embodiment of the invention, the A group is a divalent linear alkyl group chosen from the groups of the following formulae: —CH$_2$—CH$_2$— (ethylene); —CH$_2$—CH$_2$—CH$_2$— (n-propylene); —CH$_2$—CH$_2$—CH$_2$—CH$_2$— (n-butylene), and mixtures thereof.

According to one particular variant in this first embodiment, the compound of the invention is chosen from the following compounds:

MeOOC—CH$_2$—CH$_2$—CONMe$_2$;
MeOOC—CH$_2$—CH$_2$—CH$_2$—CONMe$_2$;
MeOOC—CH$_2$—CH$_2$—CH$_2$—CONMe$_2$, as a mixture with MeOOC—CH$_2$—CH$_2$—CH$_2$—CH$_2$—CONMe$_2$ and/or with MeOOC—CH$_2$—CH$_2$—CONMe$_2$.

According to a second particular embodiment of the invention, the A group is a divalent branched alkylene group having one of the following formulae (IIa), (IIb), (IIc), (IIIa) and (IIIb), or a mixture of at least two groups chosen from the groups of formulae (IIa), (IIb) and (IIc) or from the groups of formulae (IIIa) and (IIIb), or a mixture of at least two groups, one chosen from the groups of formulae (IIa), (IIb) and (IIc) and the others chosen from the groups of formulae (IIIa) and (IIIb):

—(CHR$_9$)$_y$—(CHR$_8$)$_x$—(CHR$_9$)$_z$—CH$_2$—CH$_2$— (IIa)

—CH$_2$—CH$_2$—(CHR$_9$)$_z$—(CHR$_8$)$_x$—(CHR$_9$)$_y$— (IIb)

—(CHR$_9$)$_z$—CH$_2$—(CHR$_8$)$_x$—CH$_2$—(CHR$_9$)$_y$— (IIc)

—(CHR$_9$)$_y$—(CHR$_8$)$_x$—(CHR$_9$)$_z$—CH$_2$— (IIIa)

—CH$_2$—(CHR$_9$)$_z$—(CHR$_8$)$_x$—(CHR$_8$)$_y$— (IIIb)

where:
x is an integer greater than 0;
y is an average integer greater than or equal to 0;
z is an average integer greater than or equal to 0;
R$_8$, which is identical or different, is a C$_1$-C$_6$, preferably C$_1$-C$_4$, alkyl group; and
R$_9$, which is identical or different, is a hydrogen atom or a C$_1$-C$_6$, preferably C$_1$-C$_4$, alkyl group.

In this second particular embodiment, the A group is preferably a group such that y=z=0.

Preferably, in the formula (IIa) and/or in the formula (IIb): x=1; y=z=0; R$_8$=methyl.

Preferably, in the formula (IIIa) and/or in the formula (IIIb): x=1; y=z=0; R$_8$=ethyl.

According to one particular variant in the second particular embodiment, the compound of the invention is chosen from the following compounds, and mixtures thereof:

MeOOC-A$_{MG}$-CONMe$_2$;

MeOOC-A$_{ES}$-CONMe$_2$;
PeOOC-A$_{MG}$-CONMe$_2$;
PeOOC-A$_{ES}$-CONMe$_2$;
CycloOOC-A$_{MG}$-CONMe$_2$;
CycloOOC-A$_{ES}$-CONMe$_2$;
EhOOC-A$_{MG}$-CONMe$_2$;
EhOOC-A$_{ES}$-CONMe$_2$;
PeOOC-A$_{MG}$-CONEt$_2$;
PeOOC-A$_{ES}$-CONEt$_2$;
CycloOOC-A$_{MG}$-CONEt$_2$;
CycloOOC-A$_{ES}$-CONEt$_2$;
BuOOC-A$_{MG}$-CONEt$_2$;
BuOOC-A$_{ES}$-CONEt$_2$;
BuOOC-A$_{MG}$-CONMe$_2$;
BuOOC-A$_{ES}$-CONMe$_2$;
EtBuOOC-A$_{MG}$-CONMe$_2$;
EtBuOOC-A$_{ES}$-CONMe$_2$;
n-HeOOC-A$_{MG}$-CONMe$_2$;
n-HeOOC-A$_{ES}$-CONMe$_2$; where A$_{MG}$ represents an MGa group of formula —CH(CH$_3$)—CH$_2$—CH$_2$—, or MGb group of formula —CH$_2$—CH$_2$—CH(CH$_3$)— or a mixture of MGa and MGb groups;

A$_{ES}$ represents an ESa group of formula —CH(C$_2$H$_5$)—CH$_2$—, or ESb group of formula —CH2-CH(C$_2$H$_5$)— or a mixture of ESa and ESb groups;

Pe represents a pentyl group, preferably an isopentyl or isoamyl group;

Cyclo represents a cyclohexyl group;

Eh represents a 2-ethylhexyl group;

Bu represents a butyl group, preferably an n-butyl or tert-butyl group;

EtBu represents an ethylbutyl group; and n-He represents an n-hexyl group.

In the preferred embodiment, the esteramide comprises a mixture of MeOOC-A$_{MG}$-CONMe$_2$ and MeOOC-A$_{ES}$-CONMe$_2$, which is commercially available under the tradename Rhodiasolv® Polarclean.

N,N-Dialkylamides

In a third embodiment, the solvent is an N,N-dialkylamide of a carboxylic acid, preferably an N,N-dimethyl amide of a C$_2$-C$_{20}$ carboxylic acid.

According to this third embodiment, N,N-dialkylamide is especially an AlkylDiMethylAmides (ADMA) where the alkyl is, for example, C$_6$-C$_{18}$, more particularly N,N-dimethyldecanamide and N,N-dimethyloctanamide, or mixtures with different sizes of alkyls. Mention is made especially of the compounds sold by Solvay under the tradename Rhodiasolv® ADMA810 and Rhodiasolv® ADMA10.

Diesters

In a fourth embodiment, the solvent is a diester of a carboxylic acid.

According to this fourth embodiment, the diester solvents of the compositions according to the invention correspond to the formula RaOOC-A-COORa where Ra represents a linear or branched alkyl group comprising of 1 to 6 carbon atoms, and preferably represents a methyl group, and A represents a linear or branched alkylene group comprising of 2 to 4 carbon atoms.

The diester solvent is advantageously the compound Rhodiasolv® IRIS which is a mixture comprising of 70 percent to 95 percent by weight of dimethyl 2-methyl glutarate, 5 percent to 30 percent by weight of dimethyl ethylsuccinate and 0 percent to 10 percent by weight of dimethyladipate. Alternatively, the diester solvent is advantageously the compound Rhodiasolv® RPDE which is a mixture comprising of 40 percent to 95 percent by weight of dimethylglutarate, 5 percent to 60 percent by weight of dimethylsuccinate and 0 percent to 30 percent by weight of dimethyladipate.

Surfactant

As mentioned above, the agrochemical composition according to the invention also comprises a surfactant system comprising a non ionic and an anionic surfactant.

It has been discovered that particularly good results have been obtained when the weight ratio of non ionic surfactant to anionic surfactant is greater than 1, preferably greater than 2, more preferably greater than 3.

Non Ionic

Suitable nonionic surfactants are known in the art, and include, for example, alkylaryl alkoxylates, such as alkoxylated alkylphenols, alkarylphenol alkoxylates, such as alkoxylated tristryrylphenols, alkoxylated triglycerides, such as alkoxylated castor oils or fatty acids, sorbitan fatty acid esters, such as sorbitan monooleate, alkoxylated sorbitan fatty acid esters, such as polyoxyethylene (20) sorbitan monopalmitate, alkoxylated fatty alcohols, such as ethoxylated stearyl alcohol, alkoxylated fatty acids, such as poly(ethylene glycol) monostearates, alkoxylated fatty acid esters, alkoxylated copolymers, such as ethylene/propylene block copolymers, glycoside surfactants, such as alkylglucosides and alkylpolyglucosides, amine oxides, such as cocoamine oxide, alkanolamides, such as cocoamide DEA, alkoxylated fatty amines, and mixtures thereof.

In the surfactant system according to the invention, the non ionic surfactant is advantageously selected from the group consisting of alkoxylated alkylphenols, alkoxylated tristyrylphenols, alkoxylated castor oils or fatty acids, sorbitan fatty acid esters, alkoxylated fatty alcohols, alkoxylated fatty amines, and mixtures thereof, preferably alkoxylated tristyrylphenol.

Anionic

By way of examples of anionic surfactants, mention may be made, without wishing to be limited thereto, of:

alkylsulfonic acids or arylsulfonic acids, optionally substituted with one or more hydrocarbon-based groups, and the acid function of which is partially or totally salified, such as C8-C50, more particularly C8-C30, preferably C10-C22 alkylsulfonic acids, benzenesulfonic acids or naphthalenesulfonic acids substituted with one to three C1-C30, preferably C4-C16, alkyl and/or C2-C30, preferably C4-C16, alkenyl groups; notably alkylbenzene sulfonates, and more preferably dodecylbenzene sulfonate;

alkylsulfosuccinic acid monoesters or diesters, the linear or branched alkyl part of which is optionally substituted with one or more hydroxylated and/or linear or branched C2-C4 alkoxylated (preferably ethoxylated, propoxylated or ethopropoxylated) groups; notably sulfosuccinates, phosphate esters selected more particularly from those comprising at least one linear or branched, saturated, unsaturated or aromatic hydrocarbon-based group containing 8 to 40 and preferably 10 to 30 carbon atoms, optionally substituted with at least one alkoxylated (ethoxylated, propoxylated or ethopropoxylated) group. In addition, they comprise at least one monoesterified or diesterified phosphate ester group such that one or two free or partially or totally salified acid groups may be present. The preferred phosphate esters are of the type such as monoesters and diesters of phosphoric acid and of alkoxylated (ethoxylated and/or propoxylated) mono-, di- or tristyrylphenol, or of alkoxylated (ethoxylated and/or propoxylated) mono-, di- or trialkylphenol, optionally substituted with one to four alkyl groups; of phosphoric acid and of an alkoxylated (ethoxylated or ethopropoxylated) C8-C30, and preferably C10-C22, alcohol; of phosphoric acid and of a nonalkoxylated C8-C22, and preferably C10-C22, alcohol; notably alkoxylated alkylaryl phosphates, alkoxylated alcohol phosphates, and alkoxylated tristyrylphenol phosphates;

sulfate esters obtained from saturated or aromatic alcohols, optionally substituted with one or more alkoxylated (ethoxylated, propoxylated or ethopropoxylated) groups, and for which the sulfate functions are in free or partially or totally neutralized acid form. By way of example, mention may be made of the sulfate esters obtained more particularly from saturated or unsaturated C8-C20 alcohols, which may comprise 1 to 8 alkoxylated (ethoxylated, propoxylated or ethopropoxylated) units; the sulfate esters obtained from polyalkoxylated phenol, substituted with 1 to 3 saturated or unsaturated C2-C30 hydroxycarbon-based groups, and in which the number of alkoxylated units is between 2 and 40; the sulfate esters obtained from polyalkoxylated mono-, di- or tristyrylphenol in which the number of alkoxylated units ranges from 2 to 40; notably alkoxylated distyrylphenol sulfates;

and mixtures thereof.

The anionic surfactants may be in acid form (they are potentially anionic) or in a partially or totally salified form, with a counterion. The counterion may be an alkali metal, such as sodium or potassium, an alkaline earth metal, such as calcium, or an ammonium ion of formula N(R)4+ in which R, which may be identical or different, represent a hydrogen atom or a C1-C4 alkyl radical optionally substituted with an oxygen atom.

In the agrochemical composition according to the invention, the anionic surfactant is preferably selected from the group consisting of alkylbenzene sulfonates, alkoxylated alkylaryl phosphates, alkoxylated alcohol phosphates, sulfosuccinates, alkoxylated tristyrylphenol phosphates, alkoxylated distyrylphenol sulfates, and mixtures thereof, preferably alkylbenzene sulfonates, more preferably dodecylbenzene sulfonate.

Other Additives

Water

The agrochemical composition is preferably a concentrated composition, which means that it preferably does not contain large amounts of water. Typically the water content is generally less than 10, preferably less than 5 percent by weight, more preferably less than 1 percent by weight.

The agrochemical composition is preferably a liquid formulation, for example in the form of an emulsifiable concentrate (EC), dispersible concentrate (DC) or an oil-dispersion type formulation (OD). By "oil-dispersion type" it has to be understood that the fluid used as a continuous phase that can be water-immiscible or water-miscible. The scope of the invention does not exclude the production of solid agrochemical compositions, such as formulations in which a liquid comprising the agrochemical composition is supported by a mineral and/or dispersed in a solid matrix. In this case we thus obtain a wettable powder (WP) and when granulated we obtain water-dispersible granules (WDG) or water soluble granules (WSG) or water emulsifiable granule (WEG).

The agrochemical composition may quite obviously include certain ingredients (or "other additives") other than the herbicidal substances combination, the solvent(s), the surfactant system and the optional water. It may include, in particular viscosity modifying agents, antifoam agents and defoamers, in particular silicone antifoams and defoamers, anti-rebound agents, anti-leaching agents, inert fillers, in particular mineral fillers, anti-freeze agents, stabilizers, dyes, emetic agents, stickers (adhesion promoters), etc.

Rheological Additives/Thickeners

In a particular embodiment, the agrochemical composition according to the invention may further contain rheological additives/thickeners, preferably a mineral suspending agent, more preferably selected from the group consisting of silicas, surface treated silicate, mixed oxides and mixtures thereof.

Wetting/Dispersing Agent

In some embodiments, the agrochemical composition according to the invention may further contain other surfactants as wetting and/or dispersing agents, different from the non ionic or anionic surfactant cited above, and preferably selected in the group consisting of alkoxylated C8-C24 alcohols, alkoxylated sorbitan esters, alkylnaphtalene sulfonates, condensed alkylnaphtalene sulfonates, alkoxylated alcohol phosphates, alkoxylated phosphates, phenylsulfonates, alkoxylated tristyrylphenol phosphates, alkoxylated tristyrylphenol sulfates, alkoxylated distyrylphenol sulphates, polycarboxylates, acrylic polymers and mixtures thereof, more preferably ethoxylated isodecyl alcohol.

Concentrations of the Different Components of the Composition

The agrochemical composition according to the invention comprises advantageously at least 1% by weight, preferably at least 5% by weight, more preferably at least 10% by weight of herbicidal substance (i.e. a combination of a phenylpyridazine derivative and a triketone) relative to the total weight of the agrochemical composition.

The agrochemical composition may advantageously comprise:

a) from 1 percent to 80 percent, preferably 10 percent to 60 percent by weight, of herbicidal substance (i.e. a combination of a phenylpyridazine derivative and a triketone), relative to the total weight of the agrochemical composition, b) from 10 percent to 80 percent, preferably 20 percent to 60 percent by weight, of solvent according to the invention, relative to the total weight of the agrochemical composition, c) from 5 percent to 50 percent, preferably 10 percent to 35 percent by weight, of surfactant system according to the invention, relative to the total weight of the agrochemical composition, d) from 0 percent to 10 percent, preferably 1 percent to 5 percent by weight, of rheological additives/thickeners according to the invention, relative to the total weight of the agrochemical composition, e) from 0 percent to 25 percent, preferably 5 percent to 20 percent by weight, of wetting/dispersing agent different from the surfactant system according to the invention, relative to the total weight of the agrochemical composition, f) from 0 percent to 10 percent, preferably 0 percent to 5 percent and more preferably less than 1 percent by weight of water.

Nature of the Composition

In a first embodiment, the agrochemical composition according to the invention is a dispersion of the triketone in a solution comprising the phenylpyridazine derivative, the solvent and the surfactant system.

In a second embodiment, the agrochemical composition according to the invention is a homogeneous solution of the triketone and the phenylpyridazine derivative in the solvent and the surfactant system.

Process

Known conventional methods for preparing phytosanitary formulations or mixtures of solvents may be implemented. It is possible to undertake this by simply mixing the constituents.

That's why the present invention aims at a process for the preparation of the agrochemical composition according to the invention and described above, wherein the phenylpyridazine derivative, the triketone, the surfactant system and the solvent are mixed together.

In a first embodiment of the process according to the invention, the following steps are performed:
 the phenylpyridazine derivative and the surfactant system are mixed with the solvent and,
 the triketone is dispersed in a solution comprising the phenylpyridazine, the solvent and the surfactant system,
 the triketone is micronized, preferably through a wet-milling step.

In a second embodiment of the process according to the invention, the following steps are performed:
 the phenylpyridazine derivative and the surfactant system are mixed with the solvent and,
 the triketone is solubilized in a solution comprising the phenylpyridazine, the solvent and the surfactant system.

End User Emulsion or Suspoemulsion

The agrochemical composition defined above is generally in the form of a concentrated composition, that is intended to be spread out over a cultivated field or a field to be cultivated, most often after dilution with water, in order to obtain a diluted composition. Dilution is generally carried out by the farm operator before usage, and it is going to form an emulsion or suspoemulsion. The present invention thus also provides an emulsion or suspoemulsion obtainable by diluting the agrochemical composition defined above, preferably with a dilution ratio which ranges from 0.1:99.9 to 5.0:95.0, preferably from 0.2:99.8 to 3.0:97.0 and more preferably from 0.3:99.7 to 1.0:99.0.

Dilution is generally carried out directly in a tank, for example in the tank of a device intended to spread out the composition. This does not exclude the possibility of the farm operator adding other plant protective products, for example fungicides, herbicides, pesticides, insecticides, fertilizers, tank-mix adjuvants, etc. The dilution ratios and the amounts to be applied over the field generally depend on the phytosanitary product and on the desirable dose for treating the field (this may be determined by the farm operator).

Method of Controlling Undesired Vegetation

It is the last aspect of the present invention to propose a method of controlling undesired vegetation, comprising applying an effective amount of the agrochemical composition defined above or of the agrochemical emulsion or suspoemulsion described above to plants (crop or undesired ones), seeds or to the soil.

The examples of implementation of the invention below are given purely by way of illustration, and could not in any way be limiting in nature.

EXAMPLES

In the below experimental part, the following compounds have been used:

| Origin/Commercial name | Role | Composition |
|---|---|---|
| Pyridate tech. | Herbicidal substance | Pyridate >90% |
| Mesotrione tech. | Herbicidal substance | Mesotrione >92% |
| Rhodiasolv ® ADMA 10 from Solvay | Solvent | Diamide comprising N,N-dimethyldecanamide |
| Rhodiasolv ® RPDE from Solvay | Solvent | Diester comprising dimethylglutarate and dimethylsuccinate |
| Rhodiasolv ® IRIS from Solvay | Solvent | Diester comprising dimethyl 2-methyl glutarate and dimethyl ethylsuccinate |
| Rhodiasolv ® Polarclean from Solvay | Solvent | Esteramide comprising MeOOC—CH($CH_3$)—$CH_2$—$CH_2$—$CONMe_2$ and MeOOC—CH($CH_2$—$CH_3$)—$CH_2$—$CONMe_2$. |
| Rhodiasolv ® Li-Tec 2v from Solvay | Solvent | Dioxolane comprising 2,2-dimethyl-1,3-dioxolane methanol |
| Soprophor ® CY/8 from Solvay | Non-ionic surfactant | Ethoxylated tristyrylphenol |
| Soprophor ® 796/P from Solvay | Non-ionic surfactant | Polyoxyethylene polyoxypropylene tristyrylphenol |
| Rhodacal ® 60/BE from Solvay | Anionic surfactant | 55-70% Calcium dodecylbenzene sulfonate and 30-45% alcohol |
| Solvesso 150 ND from Exxon Mobil Chemical | Oil | Aromatic oil (ND for naphthalene depleted) |
| Rhodafac ® RE/610-E from Solvay | Anionic surfactant | Polyoxyethylene nonylphenyl ether phosphate |

-continued

| Origin/Commercial name | Role | Composition |
|---|---|---|
| Geronol blend # 1 | Surfactant system | 70-80% ethoxylated tristyrylphenol, 8-16% Calcium dodecylbenzene sulfonate, 4-11% alcohol and 5-15% Solvesso 150 ND |
| Rhodafac blend # 2 | Anionic surfactant | 90-95% Polyoxyethylene tridecyl ether phosphate, 5-10% iso-type alcohols C11-14, ethoxylated, 1-3% orthophosphoric acid |
| Soprophor ® 3D33 from Solvay | Anionic surfactant | Ethoxylated tristyrylphenol phosphate |
| Soprophor TSP/461 | Non-ionic surfactant | Etho-propoxylated tristyrylphenol |
| Alkamuls ® BR from Solvay | Non-ionic surfactant | Ethoxylated castor oil |
| Alkamuls ® B from Solvay | Non-ionic surfactant | Ethoxylated castor oil |
| Alkamuls ® T/85-V from Solvay | Non-ionic surfactant | Ethoxylated Sorbitan trioleate |
| Antarox ® 724/P from Solvay | Non-ionic surfactant | Etho-propoxylated alkylphenol |
| Rhodafac ® PA/15 from Solvay | Anionic surfactant | Ethoxylated alcohol phosphate ester |
| Alkamuls ® VO/2003 from Solvay | Non-ionic surfactant | Mixture of fatty acids polyethylene glycol esters |
| Rhodasurf ® 860P from Solvay | Dispersant/wetting agent | Ethoxylated isodecyl alcohol |
| Aerosil ® R202 from Evonik Degussa | Rheological additives/thickeners | Silicones and siloxanes, dimethyl-, reaction products with silica |
| Silcolapse 482 from Elkem | Antifoam | Based on polydimethylsiloxane oil and silica |

The tests performed are standard tests.

Suspensibility is measured according to test MT 184 from CIPAC.

Storage stability at elevated temperature is performed according to test MT 46.3 from CIPAC.

Storage stability at low temperature is performed according to test MT 39.3 from CIPAC.

Dilution stability (emulsion, suspo-emulsion) is adapted from test MT 36.3 and MT 180 from CIPAC.

Viscosity (cP) is measured with a Brookfield LV viscosimeter at 20° C. and 20 rpm.

Miscibility test consists in a visual observation of a simple mixing of two liquids. They are miscible if they form only one phase.

Step 1—Preparation of an EC of Pyridate

For this first step, Pyridate Tech. miscibility in various solvents at a concentration of 16.5 wt % has been tested:

| Solvent | Comment |
|---|---|
| Water | Not miscible |
| Rhodiasolv ® ADMA 10 | Miscible |
| Rhodiasolv ® RPDE | Miscible |
| Rhodiasolv ® IRIS | Miscible |
| Rhodiasolv ® Polarclean | Miscible |
| Rhodiasolv ® Li-Tec 2v | Miscible |

Pyridate Tech. shows a good miscibility in the above solvents after 40 days at room temperature and 54° C.

The miscibility of several surfactants in compositions containing Pyridate and solvents was tested. The concentration of Pyridate Tech. was 11.0% by weight and the concentration of surfactant was 33.5% by weight, up to 100% by weight with the solvent.

| Solvent | Surfactant system | Comment on physical storage stability at various temperatures |
|---|---|---|
| Rhodiasolv ® Polarclean | Soprophor 796/P (75%) Rhodafac RE/610-E (25%) | 3 days/all temperatures: Stable 2 weeks/all temperatures: Stable |
| | Soprophor 3D33 | 5 days/20° C.: Hazy and deposits 2 weeks/20° C.: Hazy and deposits 3 months/54° C.: Crystallization |
| | Geronol blend # 1 | 3 days/20° C. and 54° C.: Stable 2 weeks/20° C. and 54° C.: Stable |
| | Soprophor TSP/461 (a 50%) (b 75%)/ Soprophor 3D33 (a 50%) (b 25%) | 3 days/all temperatures: Stable 2 weeks/all temperatures: Stable |
| Rhodiasolv ® Li-Tec 2v | Soprophor 796/P | 3 days/all temperatures: Stable 2 weeks/20° C., 45° C. and 54° C.: Crystallization |
| | Alkamuls BR | 2 days/54° C.: Stable 1 week/54° C.: Crystallization |
| | Alkamuls B | 2 days/54° C.: Stable 3 days/54° C.: Crystallization |
| | Alkamuls T/85-V | 2 days/54° C.: Stable 1 week/54° C.: Crystallization |
| | Antarox 724/P | 2 days/54° C.: Precipitate |
| | Rhodafac PA/15 | 3 days/54° C.: Stable but important off-gassing |

-continued

| Solvent | Surfactant system | Comment on physical storage stability at various temperatures |
|---|---|---|
| | Geronol blend # 1 | 3 days/20° C. and 54° C.: Stable<br>2 weeks/20° C. and 54° C.: Stable<br>5 months/20° C. and 54° C.: Stable |
| | Soprophor 796/P (25%)<br>Rhodafac RE/610-E (75%) | 3 days/all temperatures: Stable<br>2 weeks: Stable at 20° C. and crystallization at 54° C. |
| Rhodiasolv ® ADMA 10 | Soprophor 796/P (25%)<br>Rhodafac RE/610-E (75%) | 3 days/all temperatures: Stable<br>2 weeks/all temperatures: Stable except 54° C. with some crystallization |
| Rhodiasolv ® RPDE | Rhodafac RE/610-E (100%) | 5 days/20° C. and 54° C.: Stable<br>6 days: Stable at 20° C. and crystallization at 54° C. |
| | Soprophor 796/P (25%)<br>Rhodafac RE/610-E (75%) | 5 days/20° C. and 54° C.: Stable<br>6 days: Stable at 20° C. and crystallization at 54° C. |
| | Soprophor 796/P (75%)<br>Rhodafac RE/610-E (25%) | 5 days/20° C. and 54° C.: Stable<br>6 days/20° C. and 54° C.: Stable |

*All the temperature means −5° C., 20° C., 45° C. and 54° C. When some temperatures/time of storage have not been mentioned, it is because they have not been measured.

Among those formulations, only formulations having a surfactant system comprising at least one anionic and at least one nonionic surfactant lead to physically stable formulations.

Two systems (Rhodiasolv® Polarclean with Soprophor 796/P (75%)/Rhodafac RE/610-E (25%) and Rhodiasolv® Li-Tec 2v with Geronol blend #1) are selected for further formulation. Those 2 formulations are stable even after 30 days at 54° C.

Different concentrations for each system have been tested:

| Pyridate Formulation | in Rhodiasolv ® Polarclean | | in Rhodiasolv ® Li-Tec 2v | |
|---|---|---|---|---|
| Pyridate (90%) | 50.0% | | 50.0% | |
| Rhodiasolv Polarclean | 26.5% | 16.5% | — | |
| Rhodiasolv Li-Tec 2v | — | | 26.5% | 16.5% |
| Soprophor 796/P | 5.9% | 8.4% | — | |
| Rhodafac RE/610-E | 17.6% | 25.1% | | |
| Geronol blend #1 | — | | 23.5% | 33.5% |

Results

| | in Rhodiasolv ® Polarclean | | in Rhodiasolv ® Li-Tec 2v | |
|---|---|---|---|---|
| Dilution (1% in deionized water) (t = 0 min) | White emulsion | White emulsion | White emulsion | White emulsion |
| Suspensibility (1% in deionized water) | 75% | 98% | 72% | 95% |

The best results in terms of emulsification and suspensibility are obtained with an amount of surfactant of 33.5% by weight relative to the total weight of the formulation (without Mesotrione).

Pyridate concentration adjustments have been made accordingly:

| Pyridate Formulation | in Rhodiasolv ® Polarclean Pyridate 99.9 g/L | | in Rhodiasolv ® Li-Tec 2v Pyridate 99.9 g/L | | in Rhodiasolv ® Li-Tec 2v Pyridate 450 g/L | |
|---|---|---|---|---|---|---|
| | % | g/L | % | g/L | % | g/L |
| Pyridate (90%) | 10.2% | 110.4 | 10.2% | 110.7 | 50.0% | 499.95 |
| Rhodiasolv ® Polarclean | 56.3% | 609.3 | | | | |
| Rhodiasolv ® Li-Tec 2v | | | 56.3% | 604.2 | 16.5% | 183.30 |
| Soprophor 796/P | 8.4% | 91.1 | | | | |
| Rhodafac RE/610-E | 25.1% | 272.1 | | | | |
| Geronol blend # 1 | | | 33.5% | 360.2 | 33.5% | 372.20 |

Tests performed on the above formulations showed the below results:

| Formulation | in Rhodiasolv ® Polarclean Pyridate 99.9 g/L | in Rhodiasolv ® Li-Tec 2v Pyridate 99.9 g/L | in Rhodiasolv ® Li-Tec 2v Pyridate 450 g/L |
|---|---|---|---|
| Aspect | Yellow translucent | Yellow translucent | Yellow translucent |
| Dilution (1% in deionized water) | Good dispersion, white emulsion | Good dispersion, white emulsion | Light white deposit at the bottom |
| Suspensibility (1% in deionized water) | 100% | 95% | 96% |
| Storage 20° C./3 months | translucent homogeneous pourable | translucent homogeneous pourable | translucent, homogeneous pourable |
| 45° C./6 weeks | Translucent, homogeneous, pourable | Translucent, homogeneous, pourable | Translucent, homogeneous, pourable |
| 54° C./2 weeks | Translucent, homogeneous, pourable | Translucent, homogeneous, pourable | Translucent, homogeneous, pourable |

-continued

|  | in Rhodiasolv® Polarclean | in Rhodiasolv® Li-Tee 2v | |
| --- | --- | --- | --- |
| Formulation | Pyridate 99.9 g/L | Pyridate 99.9 g/L | Pyridate 450 g/L |
| −5° C./2 weeks | Translucent, homogeneous, pourable | Translucent, homogeneous, pourable | Translucent, homogeneous, pourable |

Step 2—Addition of Mesotrione:

Mesotrione has been introduced in both Rhodiasolv® Li-Tec 2v and Rhodiasolv® Polarclean. Mesotrione is not soluble in Rhodiasolv® Li-Tec 2v and is soluble in (for instance at concentration of 30 g/L) Rhodiasolv® Polarclean.

2 oil dispersions of mesotrione in pyridate formulations with different ratios of Pyridate/Mesotrione have been developed and tested. Those compositions and results are presented below.

Formulation 1—OD Pyridate 95 g/L Mesotrione 30 g/L

| Ingredients | % | g/L | Nature |
| --- | --- | --- | --- |
| Pyridate tech. | 9.90 | 106.3 | a.i |
| Rhodiasolv Li-Tec 2v | 51.40 | 552.0 | Solvent |
| Geronol blend # 1 | 33.50 | 359.8 | Surfactant blend |
| Mesotrione tech. | 2.80 | 30.1 | a.i |
| Aerosil R202 | 2.30 | 24.7 | Rheological agent |
| Silcolapse 482 | 0.10 | 1.1 | Anti-foam |

| Test | Result | |
| --- | --- | --- |
| Appearance after 2 months at 20° C. | Stable | |
| Appearance after 4 weeks at 45° C. | Stable - <5% phase separation | |
| Appearance after 12 weeks at 35° C. | Stable - Phase separation traces | |
| Appearance after 2 weeks at −5° C. | Stable | |
| Viscosity (cP) | 2200 | |
| Dilution (1% in deionized water) | $t_0$ | Stable and white translucent |
|  | 30 min | Stable and white translucent |
|  | 2 h | Stable and white |
|  | 24 h | Stable and white |
| Suspensibility (%) at $t_0$ at RT (%) (1% in deionized water) | 98 | |
| Suspensibility (%) after 14 weeks at RT (%) (1% in CIPAC D water) | 100 | |
| Suspensibility (%) after 14 weeks at 35° C. (%) (1% in CIPAC D water) | 98 | |

Formulation 2—OD Pyridate 300 g/L Mesotrione 45 g/L

| Ingredients | % | g/L | Nature |
| --- | --- | --- | --- |
| Pyridate tech. | 30.60 | 332.6 | a.i |
| Rhodiasolv® Li-Tec 2v | 28.50 | 309.8 | Solvent |
| Geronol blend # 1 | 19.90 | 216.3 | Surfactant blend |
| Mesotrione tech. | 4.20 | 45.7 | a.i |
| Aerosil® R202 | 2.30 | 25.0 | Rheological agent |
| Rhodasurf® 860/P | 14.00 | 152.2 | Wetting agent |
| Silcolapse® 482 | 0.50 | 5.4 | Anti-foam |

| Test | Result | |
| --- | --- | --- |
| Appearance after 2 months at 20° C. | Stable | |
| Appearance after 4 weeks at 45° C. | Stable - <5% phase separation | |
| Appearance after 12 weeks at 35° C. | Stable - Phase separation traces | |
| Appearance after 2 weeks at −5° C. | Stable | |
| Viscosity (cP) | 2230 | |
| Dilution (1% in deionized water) | $t_0$ | Stable and white |
|  | 30 min | Stable and white |
|  | 2 h | Stable and white |
|  | 24 h | Stable and white |
| Suspensibility (%) at $t_0$ at RT (%) in tap water | 94 | |
| Suspensibility (%) after 27 weeks at RT (1% in CIPAC D water) | 98 | |
| Suspensibility (%) after 27 weeks at 35° C. (1% in CIPAC D water) | 97 | |

After 18 weeks at 30° C. we have less than 5% of chemical degradation of Pyridate and Mesotrione.

The above formulations 1 and 2 show good physical & chemical stability, dilution and suspensibility characteristics.

3 emulsifiable concentrate (EC) formulations of mesotrione and pyridate have been developed and tested. The compositions and results are presented below.

Formulation 3—EC-Pyridate 100 g/L and Mesotrione 37 g/L

| Ingredients | % | Nature |
| --- | --- | --- |
| Pyridate tech. | 10.15 | a.i |
| Rhodiasolv ® Polarclean | 53.87 | Solvent |
| Rhodafac blend # 2 | 24.40 | Anionic Surfactant |
| Mesotrione tech. | 3.45 | a.i |
| Soprophor 796/P | 8.13 | Non-ionic surfactant |

| Test | Result | |
| --- | --- | --- |
| Appearance after 2 days at −5° C., 20° C., 45° C. and 54° C. | Stable (no sediment) | |
| Appearance after 2 weeks at −5° C., 20° C., 45° C. and 54° C. | Stable (no sediment) | |
| Dilution (1% in deionized water) | $t_0$ | Stable and translucent - no deposit |
|  | 30 min | Stable and translucent - no deposit |
|  | 1 h | Stable and translucent - no deposit |

Formulation 4—EC-Pyridate 100 g/L and Mesotrione 37 g/L

| Ingredients | % | Nature |
| --- | --- | --- |
| Pyridate tech. | 10.13 | a.i |
| Rhodiasolv ® Polarclean | 53.58 | Solvent |
| Rhodafac blend # 2 | 16.03 | Anionic Surfactant |
| Mesotrione tech. | 3.43 | a.i |
| Soprophor 796/P | 16.83 | Non-ionic Surfactant |

| Test | Result | |
| --- | --- | --- |
| Appearance after 11 weeks at 35° C. | Stable (no sediment) | |
| Appearance after 6 weeks at 45° C. | Stable (no sediment) | |
| Appearance after 2 weeks at −5° C. | Stable (no sediment) | |
| Appearance after 11 weeks 20° C. | Stable (no sediment) | |
| Dilution (1% in CIPAC D water) | t0 | Stable and translucent - no deposit |
| | 30 min | Stable and translucent - no deposit |
| | 1 h | Stable and translucent - no deposit |

Formulation 5—EC-Pyridate 100 g/L and Mesotrione 37 g/L

| Ingredients | % | Nature |
| --- | --- | --- |
| Pyridate tech. | 10.11 | a.i |
| Rhodiasolv ® Polarclean | 53.65 | Solvent |
| Rhodafac blend # 2 | 8.26 | Anionic Surfactant |
| Mesotrione tech. | 3.46 | a.i |
| Soprophor 796/P | 24.52 | Non-ionic Surfactant |

| Test | Result | |
| --- | --- | --- |
| Appearance after 11 weeks at 35° C. | Stable (no sediment) | |
| Appearance after 6 weeks at 45° C. | Stable (no sediment) | |
| Appearance after 2 weeks at −5° C. | Stable (no sediment) | |
| Appearance after 11 weeks 20° C. | Stable (no sediment) | |
| Dilution (1% in CIPAC D water) | t0 | Stable and translucent - no deposit |
| | 30 min | Stable and translucent - no deposit |
| | 1 h | Stable and translucent - no deposit |

Formulations 3, 4 and 5 show good physical storage stability and adequate dilution characteristics.

emulsifiable concentrate of tembotrione and pyridate, and 1 oil dispersion of tembotrione in pyridate have been developed and tested. Those compositions and results are presented below.

Formulation 6—EC-Pyridate 300 g/L Tembotrione 13.33 g/L

| Ingredients | % | Nature |
| --- | --- | --- |
| Pyridate tech. | 29.89 | a.i |
| Rhodiasolv Li-tec 2v | 35.24 | Solvent |
| Geronol blend #1 | 33.53 | Surfactant |
| Tembotrione | 1.29 | a.i |
| SAG 1572 | 0.05 | Antifoam |

| Test | Result | |
| --- | --- | --- |
| Appearance after 12 weeks at 35° C. | Stable | |
| Appearance after 6 weeks at 45° C. | Stable | |
| Appearance after 4 weeks at F/T | Stable | |
| Appearance after 2 weeks at −5° C. (with seed) | Stable | |
| Appearance after 12 weeks 20° C. | Stable | |
| Dilution (1% in CIPAC D water) | t0 | Stable and translucent - no deposit |
| | 30 min | Stable and translucent - Traces of deposits |
| | 2 h | Stable and translucent - Traces of deposits |

Formulation 7—OD-Pyridate 150 g/L Tembotrione 100 g/L

| Ingredients | % | Nature |
| --- | --- | --- |
| Pyridate tech. | 15.01 | a.i |
| Rhodiasolv Li-tec 2v | 39.54 | Solvent |
| Geronol blend #1 | 33.53 | Surfactant |
| Tembotrione | 9.41 | a.i |
| Aerosil R202 | 2.13 | Rheological agent |
| Silcolapse 482 | 0.36 | Antifoam |

| Test | Result | |
| --- | --- | --- |
| Viscosity (cP) | 2100 | |
| Appearance after 12 weeks at 35° C. | Stable - Top syneresis <16% | |
| Appearance after 6 weeks at 45° C. | Stable - Top syneresis <9% | |
| Appearance after 4 weeks at F/T | Stable - Top syneresis <7% | |
| Appearance after 1 weeks at −5° C. | Stable | |
| Appearance after 12 weeks 20° C. | Stable - Top syneresis <12% | |
| Dilution (1% in CIPAC D water) | t0 | White emulsion - trace of Deposits |
| | 30 min | White emulsion - 0.5 mL of deposits |
| | 2 h | White emulsion - 0.6 mL of deposits |

| Test | Result |
| --- | --- |
| Suspensibility (%) at t0 (%) (1% in CIPAC D water) | 70% |

Formulations 6 and 7 show good physical storage stability and dilution characteristics.

The invention claimed is:

1. An agrochemical composition comprising, with respect to a total weight of the agrochemical composition:
   from 10% to 80% by weight of a combination of a phenylpyridazine derivative and a triketone, as herbicidal substance, wherein the phenylpyridazine derivative is pyridate, and the triketone is mesotrione;
   from 10% to 80% by weight of a solvent selected from the group consisting of:
   dioxolanes of formula (I)

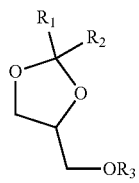

wherein
   $R_1$ and $R_2$, independently from one another, are selected from the group consisting of: a linear or branched C1-C12 alkyl, a C4-C12 cycloalkyl or an aryl;
   $R_3$ is H, a linear or branched alkyl, a cycloalkyl or a —C(=O)$R_4$ group, with $R_4$ being a linear or branched alkyl or cycloalkyl,
   esteramides of formula (II)

wherein:
   $R_5$ is a radical selected from saturated or unsaturated, linear or branched, optionally cyclic, optionally aromatic hydrocarbon-based radicals having an average number of carbon atoms ranging from 1 to 36;
   $R_6$ and $R_7$, which may be identical or different, are each radicals selected from saturated or unsaturated, linear or branched, optionally cyclic, optionally aromatic, optionally substituted hydrocarbon-based radicals having an average number of carbon atoms ranging from 1 to 36, with the proviso that $R_6$ and $R_7$ may optionally together form a ring member that is optionally substituted and/or that optionally contains a heteroatom; and
   A is a linear or branched divalent alkyl radical having an average number of carbon atoms ranging from 2 to 12;
   and mixtures thereof; and
   from 5% to 50% by weight of a surfactant system comprising:
   a non ionic surfactant selected from the group consisting of: alkoxylated alkylphenols, alkoxylated tristyrylphenols, alkoxylated castor oils or fatty acids, sorbitan fatty acid esters, alkoxylated fatty alcohols, alkoxylated fatty amines, and mixtures thereof, and
   an anionic surfactant selected from the group consisting of alkylbenzene sulfonates, alkoxylated alkylaryl phosphates, alkoxylated alcohol phosphates, alkoxylated tristyrylphenol phosphates, alkoxylated distyrylphenol sulfates, and mixtures thereof,
   the weight ratio of non ionic surfactant to anionic surfactant is greater than 1.

2. The agrochemical composition according to claim 1, wherein the weight ratio of non ionic surfactant to anionic surfactant is greater than 1.

3. The agrochemical composition according to claim 1, further comprising rheological additives/thickeners.

4. The agrochemical composition according to claim 1, further comprising other surfactants as wetting and/or dispersing agents, different from the non ionic or anionic surfactant.

5. The agrochemical composition according to claim 1, said composition comprising from 10% to 60% by weight of herbicidal substance relative to the total weight of the agrochemical composition.

6. The agrochemical composition according to claim 1, wherein the composition is a dispersion of the triketone in a solution comprising the phenylpyridazine derivative, the solvent and the surfactant system.

7. The agrochemical composition according to claim 1, wherein the composition is a homogeneous solution of the triketone and the phenylpyridazine derivative in the solvent and the surfactant system.

8. A process for the preparation of the agrochemical composition according to claim 1, the process comprising mixing the phenylpyridazine derivative, the triketone, the surfactant system and the solvent are mixed together.

9. The process according to claim 8, wherein the process comprises the following steps:
   mixing the phenylpyridazine derivative and the surfactant system with the solvent and,
   dispersing the triketone in a solution comprising the phenylpyridazine, the solvent and the surfactant system,
   micronizing the triketone.

10. The process according to claim 8, wherein the process comprises the following steps:
    mixing the phenylpyridazine derivative and the surfactant system with the solvent and,
    solubilizing the triketone in a solution comprising the phenylpyridazine, the solvent and the surfactant system.

11. An agrochemical emulsion or suspoemulsion obtained by diluting the agrochemical composition according to claim 1.

12. A method of controlling undesired vegetation, the method comprising applying an effective amount of the agrochemical composition according to claim 1 to plants, seeds or to the soil.

13. A method of controlling undesired vegetation, the method comprising applying an effective amount of the agrochemical emulsion or suspoemulsion according to claim 11 to plants, seeds or to the soil.

14. The agrochemical composition according to claim 1, wherein the weight ratio of non ionic surfactant to anionic surfactant is greater than 2.

15. The agrochemical composition according to claim 14, wherein the weight ratio of non ionic surfactant to anionic surfactant is greater than 3.

16. The agrochemical composition according to claim 1, comprising, with respect to the total weight of the agrochemical composition:
   a) from 10% to 60% by weight of said herbicidal substance;
   b) from 20% to 60% by weight of solvent;
   c) from 10% to 35% by weight of said surfactant system;
   d) from 0% to 10% by weight of rheological additives/thickeners'
   e) from 0% to 25% by weight of wetting/dispersing agent from the surfactant system; and
   f) from 0% to 10% by weight of water.

17. The agrochemical composition according to claim 1, wherein a weight ratio of pyridate:mesotrione ranges from 1:1 to 10:1.

* * * * *